United States Patent
Shin et al.

(10) Patent No.: US 7,589,920 B2
(45) Date of Patent: Sep. 15, 2009

(54) CAMERA LENS ASSEMBLY

(75) Inventors: Doo-Sik Shin, Suwon-si (KR); Jin-Soo Seol, Cheongju-si (KR); Jong-Pil Lee, Cheongju-si (KR); Byung-Cheol Lee, Chungcheongbuk-do (KR)

(73) Assignee: Ja Hwa Electronics Co., Ltd., Bugi-Myeon, Cheongwon-Gun, Chung Cheongbuk-Do (KR)

( * ) Notice: Subject to any disclaimer, the term of this patent is extended or adjusted under 35 U.S.C. 154(b) by 0 days.

(21) Appl. No.: 12/100,484

(22) Filed: Apr. 10, 2008

(65) Prior Publication Data
US 2008/0253003 A1    Oct. 16, 2008

(30) Foreign Application Priority Data
Apr. 10, 2007    (KR) .................. 10-2007-0035155

(51) Int. Cl.
*G02B 7/02* (2006.01)
(52) U.S. Cl. .................... 359/811; 359/819
(58) Field of Classification Search ............... 359/811, 359/819
See application file for complete search history.

(56) References Cited

U.S. PATENT DOCUMENTS
5,828,503 A * 10/1998 Kaneda et al. ............... 359/824

FOREIGN PATENT DOCUMENTS
JP    58-185036    10/1983
JP    2006-227062    8/2006

* cited by examiner

*Primary Examiner*—Jordan M. Schwartz
*Assistant Examiner*—James C Jones
(74) *Attorney, Agent, or Firm*—Cha & Reiter, LLC

(57) ABSTRACT

A camera lens assembly providing focal length adjustment to permit mounting in a personal portable terminal. The camera lens assembly includes a lens assembly; a driving unit provided in one side of the lens assembly; and a guide section provided between the lens assembly and the driving unit, wherein the lens assembly moves forward and backward in a direction of an optical axis to the driving unit by guidance of the guide section. The guide section enhances an auto-focusing function and simplifies mounting of the camera lens assembly, rendering it possible to secure portability even when a camera is mounted to a miniaturized personal portable device such as a mobile communication terminal, a portable computer or the like.

20 Claims, 4 Drawing Sheets

CAMERA LENS ASSEMBLY

CLAIM OF PRIORITY

This application claims priority under 35 U.S.C.§ 119 from an application entitled "Camera Lens Assembly," filed with the Korean Intellectual Property Office on Apr. 10, 2007 and assigned Serial No. 2007-35155, the contents of which are incorporated herein by reference in its entirety.

BACKGROUND OF THE INVENTION

1. Field of the Invention

The present invention relates to an adjustable camera lens assembly. More particularly, the present invention relates to a camera lens assembly configured in such a manner that it can automatically adjust the focal length of a lens in an optical unit mounted to a digital camera, a mobile communication terminal or the like.

2. Description of the Related Art

Recent advances in the field of photography, which include improvements in digital camera manufacturing techniques, have brought about the advent of a micro-sized/light-weighted camera lens assembly, as it is now possible to mount a camera to a mobile communication terminal. Accordingly, a mobile communication terminal having an optical lens and a camera unit mounted thereon has been widely used.

In earlier stages of digital camera manufacturing techniques, when a camera was mounted to a mobile communication terminal, the level of performance of a camera mounted to a mobile communication terminal at that time was considerably lower than that of a digital camera commercialized today. For example, while performance of a popular-type digital camera was 4 mega-pixel grade, the performance of a camera mounted to a mobile communication terminal was usually about 3 hundred thousand-pixel grade and performance of a camera mounted to an advanced terminal was no greater than 1 mega-pixel grade.

Recently, a camera generally having about a 1 mega-pixel grade has been able to mounted to a mobile communication terminal in the case of an advanced terminal, a 3 mega-pixel camera comparable to a popular-type digital camera is mounted, and a mobile communication terminal mounted with a camera having performance of 7 or more mega-pixel grade has been successfully commercialized. In this way, with the improvement in the precision of a manufacturing technique for a camera lens assembly, it has become possible to improve the camera function for a mobile communication terminal so that the pixel grade approaches that of standalone cameras.

Although, a mobile communication terminal has gradually made inroads into the digital camera market with the improvement in the precision of performance and a manufacturing technique for a camera lens assembly, there are still a number of limitations to raising the performance of a camera mounted to a mobile communication terminal up to the same level as a standalone digital camera, particularly when considering that the main functions of a mobile communication terminal are the securement of a communication function, as well as portability.

Even a general compact-type digital camera is basically provided with an optical zoom function and an auto-focusing function, and some kinds of digital cameras are provided with a handshake correction function. However, it is difficult to provide an optical zoom function, an auto-focusing function and a handshake correction function in a camera lens assembly mounted to a mobile communication terminal because the main functions (such as the communication function and portability) must be preferentially considered for the design of a mobile communication terminal.

SUMMARY OF THE INVENTION

Accordingly, the present invention has been made in part to solve at least some of the above-mentioned problems known in the prior art. The present invention provides a camera lens assembly which has an auto-focusing function and can be easily miniaturized.

Also, the present invention provides a camera lens assembly which is miniaturized to the extent that it can be mounted to a mobile communication terminal, a portable computer or the like, and yet includes an auto-focusing function.

In accordance with an exemplary aspect of the present invention, there is provided a camera lens assembly including: a lens assembly; a driving unit provided in one side of the lens assembly; and a guide section provided between the lens assembly and the driving unit, wherein the lens assembly moves forward and backward in a direction of an optical axis to the driving unit by guidance of the guide section.

According to an exemplary embodiment of the present invention, a camera lens assembly includes: a driving unit for moving a lens assembly forward and backward in a direction of an optical axis so as to embody an auto-focusing function, the driving unit being provided in one side of the lens assembly, and a guide section between the lens assembly and the driving unit so as to enable smooth forward/backward movement of the lens assembly. According to a particular exemplary embodiment of the present invention, the configuration of the driving unit includes a voice coil motor, and provides balls, as the guide section, between the lens assembly and the driving unit so as to enable smooth movement of the lens assembly. The guide section as configured above enables smooth forward/backward movement of the lens assembly, and thus the configuration of the driving unit is simplified. Therefore, a camera lens assembly is miniaturized enough to be easily mounted to a portable device such as a mobile communication terminal.

BRIEF DESCRIPTION OF THE DRAWINGS

The above and other exemplary features, aspects, and advantages of the present invention will be more apparent from the following detailed description taken in conjunction with the accompanying drawings, in which.

DETAILED DESCRIPTION OF THE INVENTION

Figure 1:
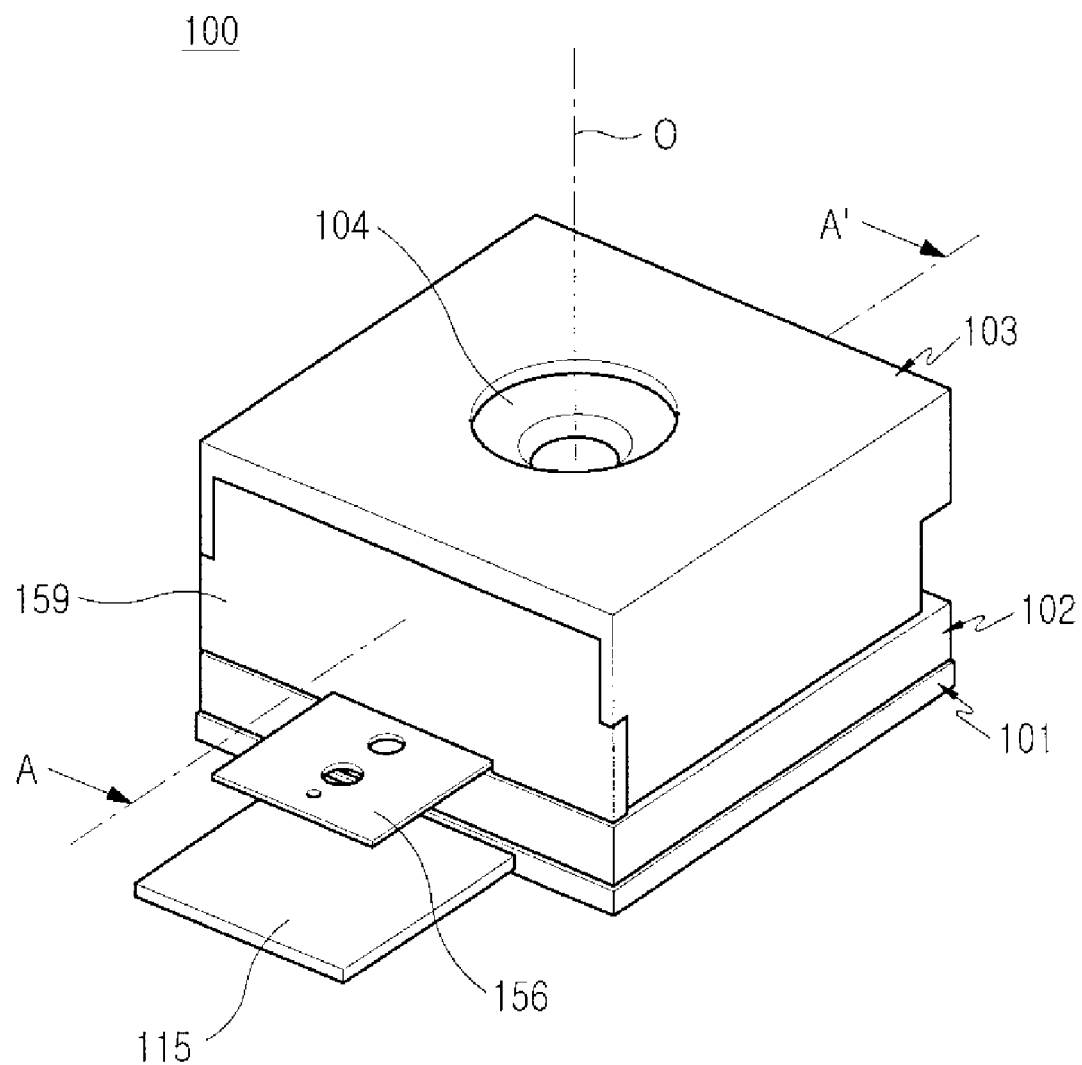
FIG. 1 is a perspective view illustrating a camera lens assembly according to an exemplary embodiment of the present invention.

Hereinafter, exemplary embodiments of the present invention will be described in detail with reference to the accompanying drawings. In the following description of the present invention, a detailed description of known functions and configurations incorporated herein may be omitted when such inclusion would obscure appreciation of the subject matter of the present invention by a person of ordinary skill in the art. A person of ordinary skill in the art understands and appreciates that the claimed invention is not limited to the illustrations and associated descriptions that have been provided herein for explanatory purposes.

As shown in FIGS. 1 to 4, a camera lens assembly 100 according to one exemplary embodiment of the present invention includes a driving unit 105 (shown in exploded view in FIG. 2) provided in one side of a lens assembly 104 so as to move the lens assembly 104 forward and backward in the direction of an optical axis 0, and a guide section between the lens assembly 104 and the driving unit 105.

In the camera lens assembly 100, a sensor assembly 101 for detecting an image to includes an image sensor 113, a circuit board 111 and a flexible printed circuit board 115. The image sensor 113 disposed on an imaging surface is mounted on one side surface of the circuit board 111 by wire bonding, and the flexible printed circuit board 115, which extends from the circuit board 111, is connected to a main circuit board (not shown) of a camera or a mobile communication terminal. The image sensor 113, an infrared filter 119 (shown in FIG. 3) which will be described below, and the lens assembly 104 are typically arranged along the optical axis 0.

Figure 3:
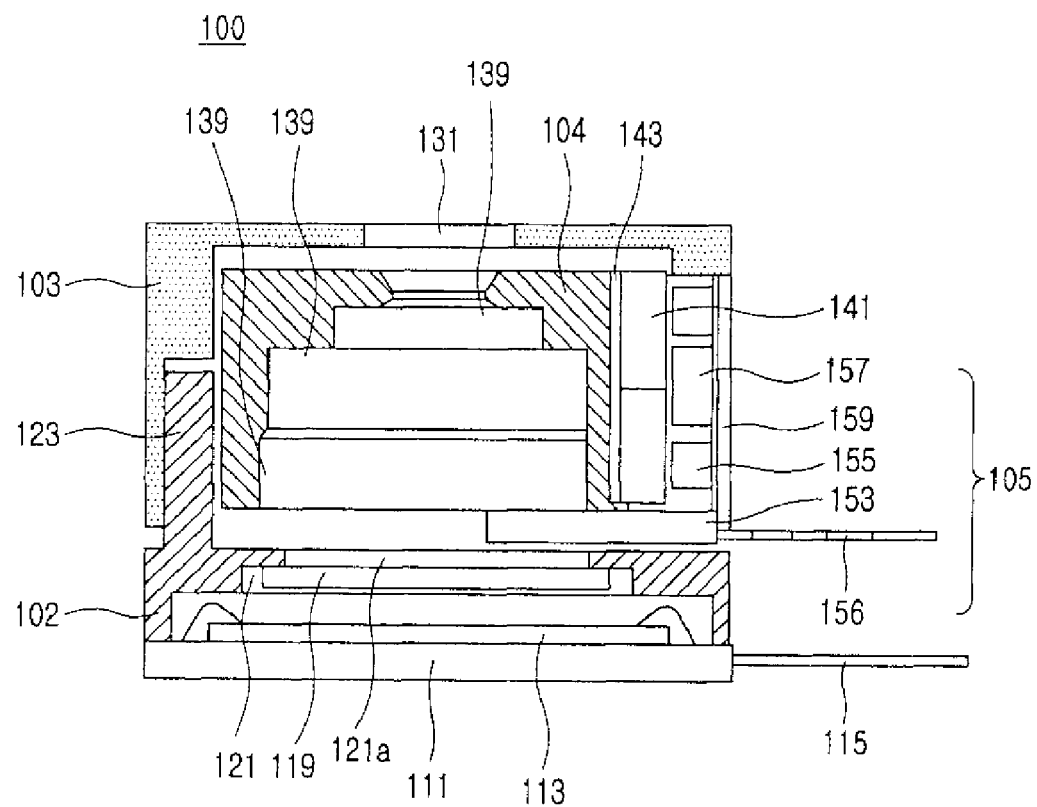
FIG. 3 is a cross-sectional view illustrating a camera lens assembly taken along a line A-A' shown in FIG. 1.

Now referring to FIG. 3, in order to provide the infrared filter 119, a filter housing 102 enclosing the image sensor 13 is provided in the circuit board 111. An aperture 121, which is in a photographing path of the image sensor 113, is formed on the filter housing 102, and the infrared filter 119 is provided in the aperture 121. It must be noted that the infrared filter 119 is omitted in FIG. 1 in order to simplify illustration of the configuration. Preferably, the filter housing 102 is mounted on the circuit board 111, and an upper portion 121a of the aperture 121 is typically closed off by the infrared filter 119, so that the image sensor 113 is isolated from exterior light so as to detects only an incident image via the infrared filter 119.

Figure 2:
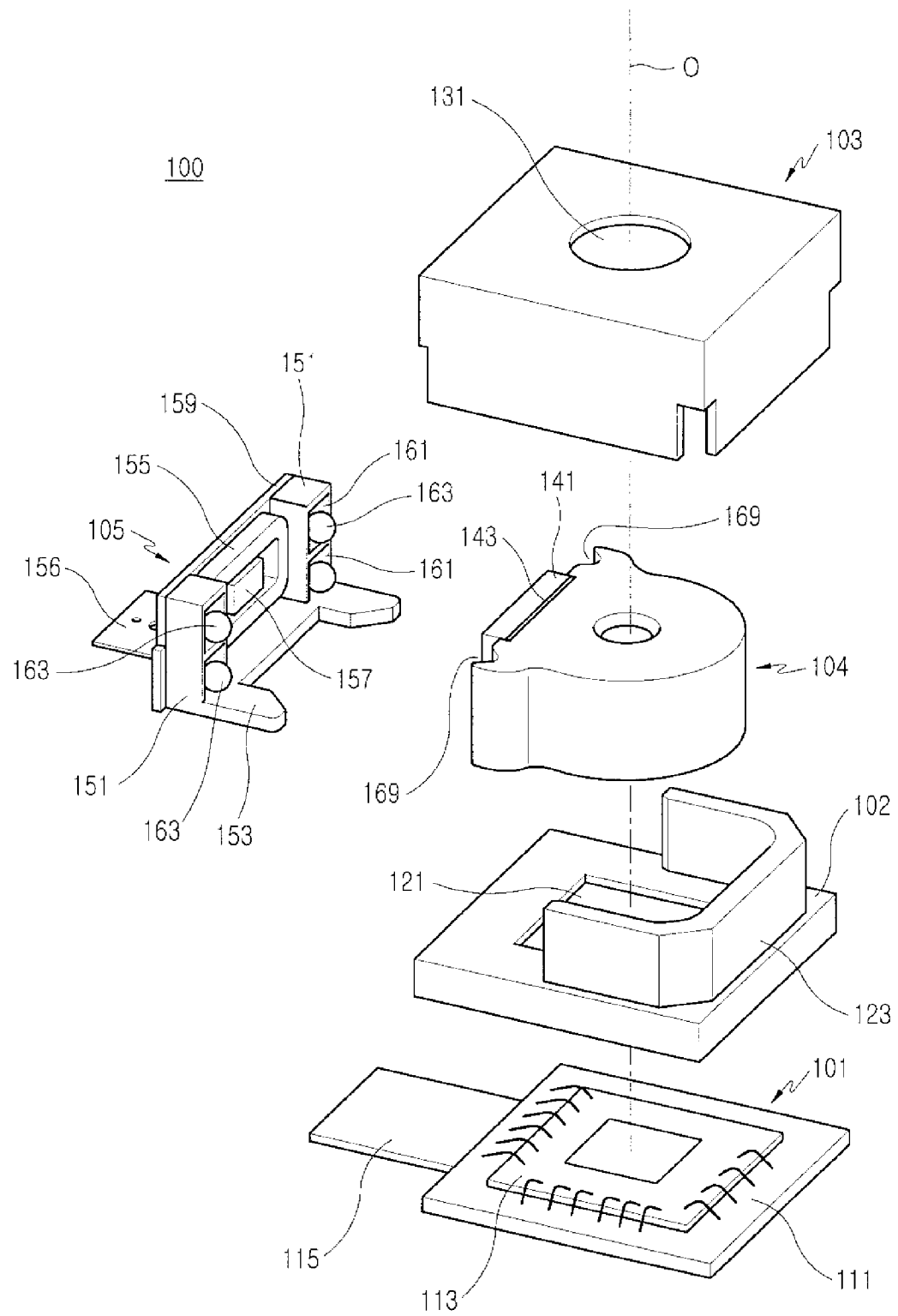
FIG. 2 is an exploded perspective view illustrating a camera lens assembly shown in FIG. 1.

Still referring to the example shown in FIGS. 2 and 3, on one side surface of the filter housing 102, a guide 123 typically extends along the direction of the optical axis 0. It is preferable that the guide 123 be disposed in such a manner as to partially wrap around a portion of an outer circumferential surface of the lens assembly 104, thereby guiding forward/backward movement of the lens assembly 104 only in the direction of the optical axis 0.

Now referring to FIG. 3, inside of the lens assembly 104, at least one or more lenses 139 are provided, and the lens adjusts a focal length, moving forward and backward in the direction of the optical axis 0. On one side surface of the lens assembly 104, a magnetic substance 141 is mounted. The magnetic substance 141 faces the driving unit 105, and generates driving power for moving the lens assembly 104 forward and backward by interacting with a coil 155 (a perspective view is shown in FIG. 2) provided in the driving unit 105.

Figure 4:
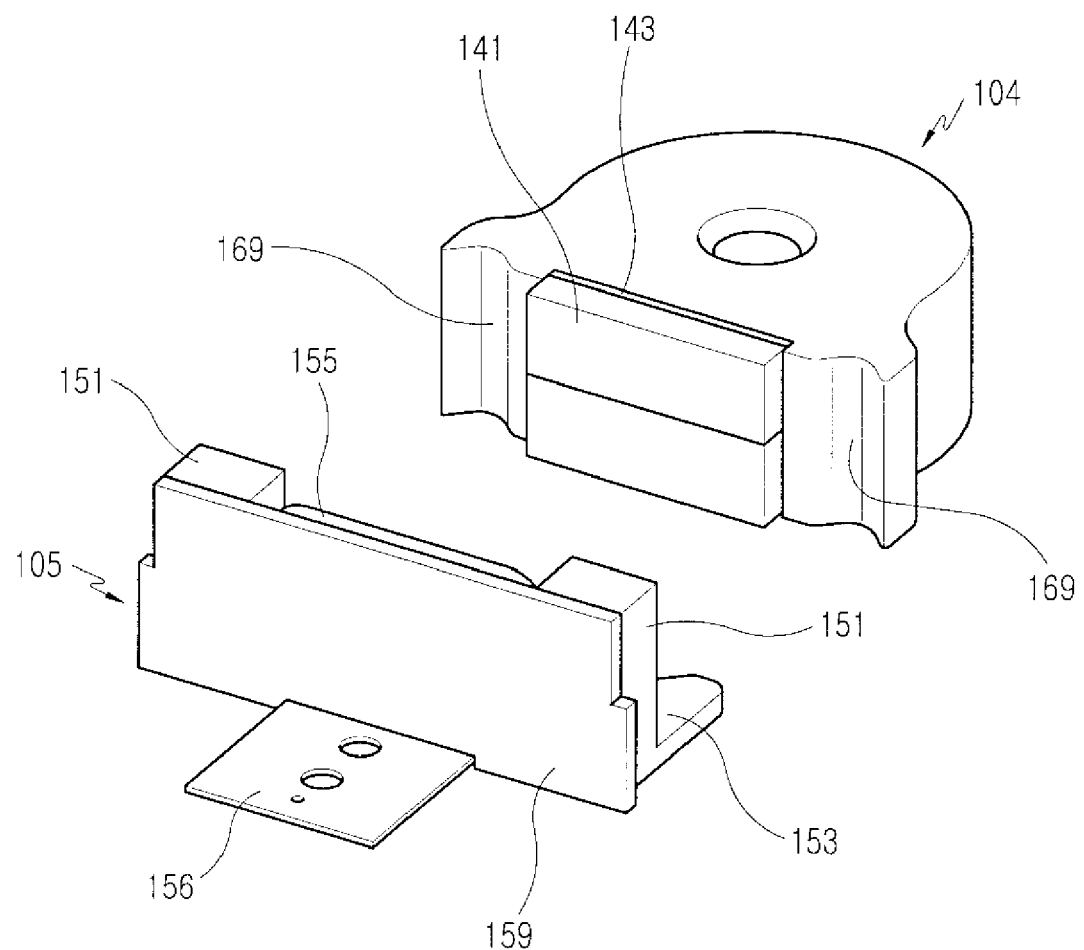
FIG. 4 is an exploded perspective view illustrating main components of a camera lens assembly shown in FIG. 1.

Now referring to FIGS. 3 and 4, so as to induce a magnetic field of the magnetic substance 141 in the direction of the driving unit 105, a first yoke 143 may be provided on one side surface of the lens assembly 104. The first yoke 143 is interposed between the magnetic substance 141 and the lens assembly 104.

Now referring to FIG. 2, the driving unit 105 includes a driving base 151 of which a lower portion is formed with a stopper 153, and the coil 155 is provided on the driving base 151 and faces the magnetic substance 141 of lens assembly 104. When current is applied to the coil 155, the coil 155 generates an electric field, and thus the electric field of the coil 155 and the magnetic field of the magnetic substance 141 interact with each other thereby generating driving power for moving the lens assembly 104 forward and backward along the optical axis. In addition to the coil 155 being provided on the driving base 151, a second yoke 159 is mounted on the driving unit 105 so as to induce the electric field of the coil 155 in the direction of the magnetic substance 141. The second yoke 159 is mounted to the driving base 151, and the coil 155 is attached to the second yoke 159 and is assembled in a form surrounded by the driving base 151.

Now referring to FIGS. 2 and 3, in order to detect a position change of the lens assembly 104, a sensor, such as Hall sensor 157, is provided in the driving unit 105, and detects a position change of the magnetic substance 141 mounted to the lens assembly 104. The magnetic substance 141 is preferably mounted to the lens assembly 104 so that the Hall sensor 157 can detect the position change of the lens assembly 104.

The Hall sensor 157, together with the coil 155, is attached to the second yoke 159, and is preferably assembled so as to be surrounded by the coil 155. The driving unit 105 typically includes another flexible printed circuit board 156, so as to apply electric power to each of the coil 155 and the Hall sensor 157 and for transferring a value of the position change of the magnetic substance 141 sensed by the Hall sensor 157.

Now referring to FIGS. 3 and 4, when the lens assembly 104 is coupled with the driving unit 105 as configured in the above example, the lens assembly 104 is tightly coupled with the driving base 151 by the attractive force generated between the magnetic substance 141 and the second yoke 159. At the same time, when current is not applied to the coil 155, the magnetic substance 141 is moved in the direction of a central portion of the second yoke 159 by its own magnetic force, thereby tightly coupling the lens assembly 104 with the stopper 153. A person of ordinary skill in the art should appreciate that the current of the coil is about zero without application of the current, but it is within the spirit of the invention and the scope of the appended claims that a small current could still be applied to the coil that is insufficiently strong enough to overcome the movement in the direction of the magnetic substance to the second yoke by the magnetic forces of the substance 141.

More particularly, one side surface of the lens assembly 104 faces the driving base 151, and a lower surface of the lens assembly 104 faces the stopper 153. When current is not applied to the coil 155, the lens assembly 104 stops at a position where the lower surface may be tightly coupled with the stopper 153. When current is applied to the coil 155 while the lens assembly 104 is stopped, the electric field generated by the coil 155 and the magnetic field of the magnetic substance 141 interact with each other so that the lens assembly 104 moves along the direction of the optical axis 0. According to this example of the present invention, by applying a value of electrical current to the coil 155, a moving distance and a moving direction of the lens assembly 104 are set based on the value, and thus a focal length of the camera lens assembly 100 is thereby adjusted.

When the driving unit 105 and the lens assembly 104 are coupled with the filter housing 102, one side surface of the lens assembly 104 faces the driving unit 105, and typically an outer circumferential surface is preferably wrapped by the guide 123. Therefore, the lens assembly 104 surrounded by the driving unit 105 and the guide 123 can move only in the direction of the optical axis 0.

The lens assembly 104 has a tendency to tightly couple with the driving base 151 due to the magnetic substance 141 and the second yoke 159. When the lens assembly 104 is coupled with the driving base 151, forward/backward movement of the lens assembly 104 is practically impossible, or even if possible, more driving power is required. Therefore, the camera lens assembly 100 provides the guide section between the driving unit 105 and the lens assembly 104, thereby moving the lens assembly 104 forward and backward with only less driving power.

Referring to FIGS. 2 and 4, the guide section includes a couple of guide grooves 169 formed on one side surface of the lens assembly 104, the driving unit 105, receiving grooves 161, which are formed on the driving base 151 and face the guide grooves 169, and balls 163 received in the receiving grooves 161.

The guide grooves 169, which typically comprise V-shaped grooves, extend in the direction of the optical axis 0 and are disposed on both sides of the magnetic substance 141. There are two pairs of the receiving grooves 161, and each pair is disposed in such a manner as to face each of the guide grooves 169. It is preferable that at least one pair on one side of the receiving grooves 161 is formed in a V-shape like the shape of the guide groove 169.

The reason the guide grooves 169 and the receiving grooves 161 are formed in V-shapes is to restrict forward/backward movement of the lens assembly 104 only in the direction of the optical axis 0.

Referring to FIG. 2, each of the balls 163 is received in each of the receiving grooves 161, and some portion of an outer circumferential surface of each ball protrudes from each receiving groove 161 and contacts with an inner surface of each guide groove 169. Also, the balls 163 enable smooth forward/backward movement of the lens assembly 104 by rolling between the receiving grooves 161 and the guide grooves 169. More particularly, some portion of each ball 163 is received in the receiving groove 161 and the other portion is received in the guide groove 169, so that a certain interval between the driving unit 105 and the lens assembly 104 can be secured. At the same time, during forward/backward movement of the lens assembly 104, the rolling movement of the balls 163 eases an occurrence of friction force.

According to this example of the present invention, as the guide grooves 169 and the receiving grooves 161 are formed in V-shapes, the balls 163 can move only in the direction to which the guide grooves 169 extend. Therefore, the lens assembly 104 moves forward and backward only in the direction of the optical axis 0 due to a configuration of the guide section, as well as the guide 123.

In other words, the lens assembly 104 has a tendency to tightly couple with the driving unit 105 due to attractive force generated between the magnetic substance 141 and the second yoke 159, and thus is disposed apart from the driving unit 105 by a certain interval due to the guide section, specifically, the balls 163 so that it is possible to smoothly move forward and backward along the optical axis.

When the driving unit 105 and the lens assembly 104 are assembled with the interposed guide section, the lens assembly 104 maintains the status of the lower surface by tightly coupling with the stopper 153. When current is applied to the coil 155 while the lower surface of the lens assembly 104 is tightly coupled with the stopper 153, driving power corresponding to the applied current value is generated, and as the lens assembly 104 moves in the direction of the optical axis 0 by the driving power, a focal length of the lens assembly is adjusted.

The lens assembly 104 maintains a moving distance apart from the stopper 153 while the current applied to the coil 155 is maintained. On the other hand, when the current applied to the coil 155 is cut off, driving power is lost so that the lens assembly 104 is again tightly coupled with the stopper 153 by a tendency of the magnetic substance 141 to position at a central portion of the second yoke 159.

Referring again to FIG. 2, when the sensor assembly 101, the filter housing 102, the lens assembly 104 and the driving unit 105 are assembled, a module housing 103 for covering the driving unit 105 and the lens assembly 104 is mounted to the filter housing 102. The module housing 103 includes another aperture 131 providing an incident path for a subject image, and is coupled with the guide 123 of the filter housing 102, in which one side surface of the module housing 103 is shut off by the driving unit 105, specifically, the second yoke 159. Therefore, the lens assembly 104 is received in the module housing 103, and moves forward and backward within the module housing 103.

A camera, a mobile communication terminal, or the like including the camera lens assembly 100 configured as described above, through the image sensor 113, photographs an incident image from the lens assembly 104. Here, when a focal length of the lens assembly 104 is not properly adjusted, the resolution of the image photographed by the image sensor 113 is degraded, and a controller (not shown) of a camera or a mobile communication terminal senses it and generates a signal for moving the lens assembly 104 forward and backward.

By the signal generated from the controller, a current is applied to the coil 155, and the electric field generated by the coil 155 and the magnetic field of the magnetic substance 141 interact with each other so that the lens assembly 104 moves forward and backward. In other words, the lens assembly moves forward and backward in relation to a current of the coil. When the lens assembly 104 moves forward and backward, the Hall sensor 157 senses a position change of the lens assembly 104, specifically, the magnetic substance 141, and transfers the value to the controller. The controller compares a signal value, which is generated by the controller so as to move the lens assembly 104, with a position-changed value of the lens assembly 104, which is sensed by the Hall sensor 157, and, according to the result of the comparison, again generates a signal for moving the lens assembly 104 forward and backward.

That is, the camera lens assembly 100 moves the lens assembly 104 forward and backward by detecting that the lens assembly 104 is stopped at a position according to its focal length, and precisely adjusts a focal length by sensing a position change of the lens assembly 104 through the Hall sensor 157.

As described above, a camera lens assembly according to the present invention includes a guide section between a lens assembly and a driving unit, and thus there are advantages in that the configuration is simplified and an auto-focusing function is easily mounted. Also, there are other advantages in that a camera is easily miniaturized due to the simplified configuration of the camera lens assembly and it is possible to easily secure the portability when the camera is mounted to a miniaturized device such as a mobile communication terminal, a portable computer or the like.

Also, in the configuration of a guide section, balls between a lens assembly and a driving unit make forward/backward movement of the lens assembly smooth, thereby reducing driving power for driving the lens assembly. Therefore, there is an advantage in that a camera lens assembly is miniaturized because it is possible to simplify the configuration of the driving unit.

Also, in the configuration of a driving unit, a hall sensor is mounted, and the sensor senses a position change of a lens assembly, thereby enabling more precise adjustment of a focal length.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A camera lens assembly comprising:
a movable lens assembly;
a driving unit arranged on one side of the lens assembly for driving the lens assembly and driving the lens assembly forward and backward along a direction of an optical axis; and
a guide section arranged between the lens assembly and the driving unit for guiding the movement of the lens assembly along the direction of the optical axis,
wherein the driving unit includes a driving base, and a stopper formed on a lower portion of the driving base and the lens assembly is arranged so that one side surface faces the driving base and a lower surface faces the stopper.

2. The camera lens assembly according to claim 1, wherein the lens assembly comprises a magnetic substance mounted on one side surface of the lens assembly; the driving unit comprises a driving base and a coil mounted on the driving base for generating electromagnetic force in conjunction with said magnetic substance for moving the lens assembly forward and backward in relation to a current of the coil.

3. The camera lens assembly according to claim 2, further comprising a first yoke interposed between one side surface of the lens assembly and the magnetic substance.

4. The camera lens assembly according to claim 3, further comprising a second yoke mounted to the driving base of said driving unit, and wherein the coil is attached to the second yoke and faces the magnetic substance.

5. The camera lens assembly according to claim 2, further comprising: a first yoke interposed between one side surface of the lens assembly and the magnetic substance, and a second yoke mounted to the driving base of said driving unit, and wherein the coil is attached to the second yoke and faces the magnetic substance.

6. The camera lens assembly according to claim 2, further comprising a Hall sensor mounted in a form surrounded by the coil on the driving base, and wherein the Hall sensor senses a position change of the magnetic substance.

7. The camera lens assembly according to claim 4, further comprising a Hall sensor mounted in a form surrounded by the coil on the driving base, and wherein the Hall sensor senses a position change of the magnetic substance.

8. The camera lens assembly according to claim 7, further comprising a second yoke mounted to the driving base, and wherein the coil and the Hall sensor are attached to the second yoke and face the magnetic substance.

9. A camera lens assembly comprising:
a movable lens assembly;
a driving unit arranged on one side of the lens assembly for driving the lens assembly and driving the lens assembly forward and backward along a direction of an optical axis;
a guide section arranged between the lens assembly and the driving unit for guiding movement of the lens assembly along the direction of the optical axis,
wherein the guide section comprises a couple of guide grooves formed on one side surface of the lens assembly, a plurality of receiving grooves which are formed on the driving unit and face the guide grooves, and balls received in the receiving grooves and some portion of an outer circumferential surface of each ball protrudes from each receiving groove and contacts with an inner surface of each guide groove.

10. The camera lens assembly according to claim 9, wherein the guide grooves extend in the direction of the optical axis of the lens assembly, and comprise V-shaped grooves.

11. The camera lens assembly according to claim 9, wherein the receiving grooves are arranged in pairs, and each pair of the receiving grooves is disposed in such a manner as to face each of the guide grooves, and at least one pair of the receiving grooves are V-shaped grooves.

12. The camera lens assembly according to claim 9, wherein the guide grooves are V-shaped grooves and extend in the direction of the optical axis of the lens assembly; wherein the receiving grooves are arranged in pairs, and each pair of the receiving grooves is disposed in such a manner as to face each of the guide grooves; and at least one pair of the receiving grooves are V-shaped grooves.

13. The camera lens assembly according to claim 1, wherein the guide section comprises: a pair of guide grooves formed on one side surface of the lens assembly, a plurality of receiving grooves which are formed on the driving base and face the guide grooves, and balls received in the receiving grooves, and wherein some portion of an outer circumferential surface of each ball protrudes from each receiving groove and contacts with an inner surface of each guide groove.

14. The camera lens assembly according to claim 1, further comprising: a filter housing provided on a lower portion of the lens assembly, and a guide extending from the filter housing and partially wrapping the lens assembly, and wherein the stopper of the driving unit is mounted to the filter housing.

15. The camera lens assembly according to claim 14, further comprising: a circuit board further comprising an image sensor being mounted on one side surface, and an infrared filter mounted to the filter housing, and wherein the circuit board is mounted to the filter housing, and the infrared filter, image sensor, and the lens assembly, are arranged on the optical axis.

16. The camera lens assembly according to claim 14, further comprising a module housing including an aperture for providing a photographing path of the lens assembly, and wherein the module housing is coupled with the filter housing for receiving the lens assembly.

17. The camera lens assembly according to claim 1, wherein the lens assembly comprises a magnetic substance mounted on one side surface of the lens assembly; the driving unit comprises a coil which is mounted on the driving base facing the magnetic substance; and
wherein the driving unit moves the lens assembly moves forward and backward in relation to a current of the coil.

18. The camera lens assembly according to claim 17, further comprising: a first yoke interposed between one side surface of the lens assembly and the magnetic substance, and a second yoke mounted to the driving base, and wherein the coil is attached to the second yoke and faces the magnetic substance.

19. The camera lens assembly according to claim 18, further comprising a Hall sensor mounted to the second yoke in a form surrounded by the coil, and wherein the Hall sensor senses a position change of the magnetic substance.

20. The camera lens assembly according to claim 18, wherein when a value of current of the coil is about zero, the magnetic substance moves in the direction of a central portion of the second yoke and tightly couples the lens assembly with the stopper.

* * * * *